R. E. BOTHWELL.
STEREOPTICON SLIDE HOLDER.
APPLICATION FILED DEC. 22, 1915.
1,196,924.
Patented Sept. 5, 1916.
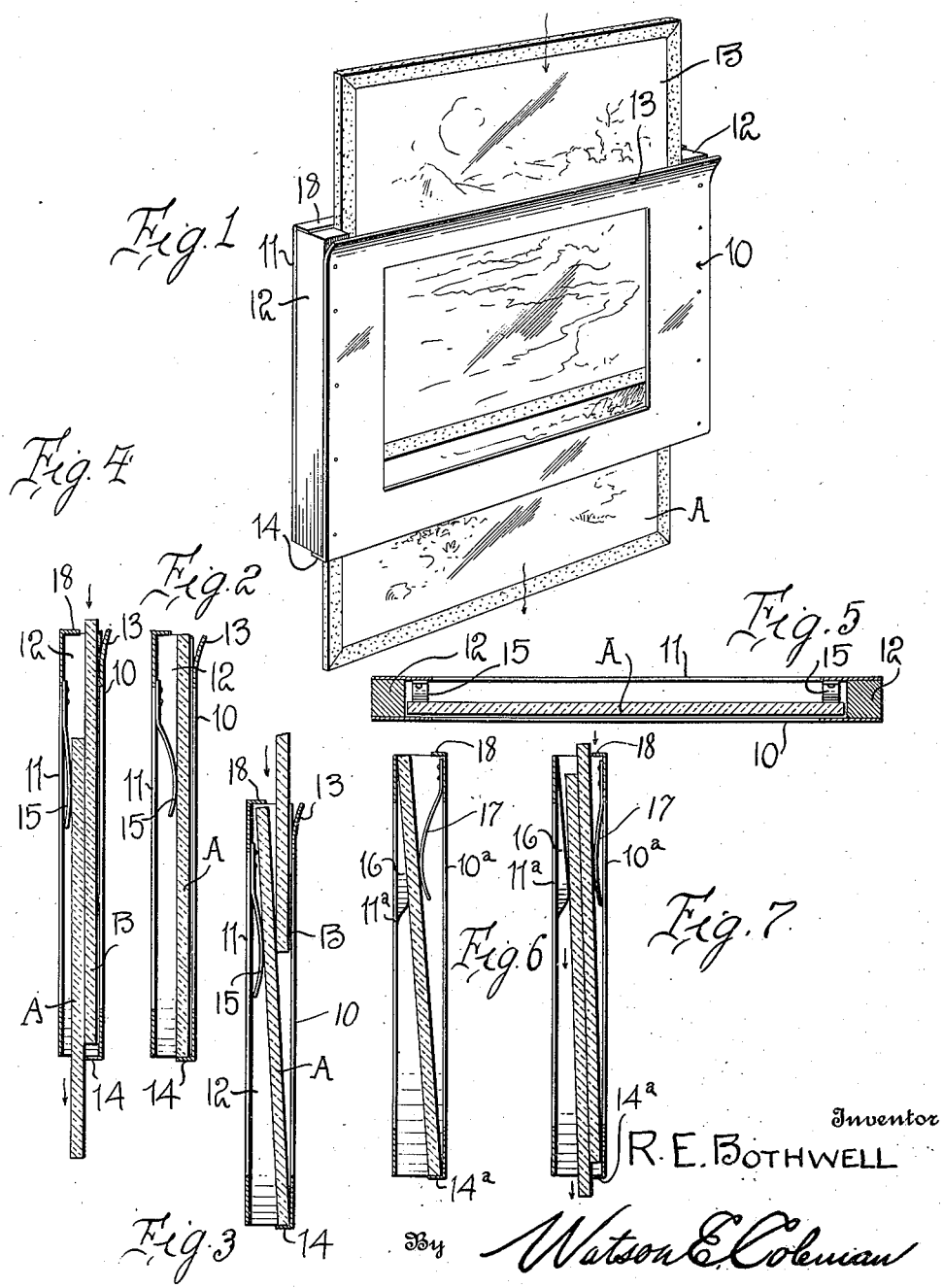
Inventor
R. E. BOTHWELL
By Watson E. Coleman
Attorney

UNITED STATES PATENT OFFICE.

RUSSELL E. BOTHWELL, OF LINCOLN, NEBRASKA.

STEREOPTICON-SLIDE HOLDER.

1,196,924.      Specification of Letters Patent.      Patented Sept. 5, 1916.

Application filed December 22, 1915. Serial No. 68,216.

*To all whom it may concern:*

Be it known that I, RUSSELL E. BOTHWELL, a citizen of the United States, residing at Lincoln, in the county of Lancaster and State of Nebraska, have invented certain new and useful Improvements in Stereopticon-Slide Holders, of which the following is a specification, reference being had to the accompanying drawings.

My invention relates to holders for supporting slides within a stereopticon, and the general object of my invention is the provision of a very simple, cheap and effective slide holder for this purpose, so constructed that it will permit the ready insertion of slides, and further so constructed that the insertion of one slide will automatically release the other slide from its engagement with the holder and permit the first slide to drop out of the holder.

Still another object of my invention is the provision of a slide holder so constructed that the insertion and removal of the slides will cause a dissolving view effect such as is ordinarily obtained by the use of a double lantern.

Still another object is to provide a slide holder which takes up very little space and which is particularly essential in portable lanterns.

Other objects will appear in the course of the following description.

My invention is illustrated in the accompanying drawings, wherein:

Figure 1 is a perspective view of a slide holder constructed in accordance with my invention; Fig. 2 is a vertical section therethrough showing the slide in place; Fig. 3 is a like view to Fig. 2, but showing the manner in which a new slide is inserted; Fig. 4 is a like view to Fig. 3 but showing the first slide dislodged and dropping out of the holder; Fig. 5 is a transverse section of the holder shown in Fig. 1; Figs. 6 and 7 are vertical sections of a modified form of holder.

In the drawings I have shown two forms of my invention, Figs. 1 to 5 showing the simplest form thereof. By these figures it will be seen that the slide holder comprises the oppositely disposed metallic plates 10 and 11 each of which is cut out at its middle so as to form a rectangular frame, these plates being spaced from each other by the vertically disposed end strips 12. The space between these strips is somewhat greater than the thickness of two ordinary lantern slides. Preferably the upper margin of the plate 10 is outwardly deflected as at 13, while the lower margin of the plate 10 is inwardly bent, as at 14, so as to form a ledge, this inwardly bent portion having a width equal to the thickness of a slide.

Mounted upon the plate 11 in any suitable manner on each side of the sight opening are the downwardly extending flat springs 15. These springs are preferably leaf springs and extend downward and outward almost to the other plate 10.

Now upon the insertion of a slide into the plate holder the springs 15 will guide the slide downward so that its lower edge will rest upon the ledge or flange 14, and under these circumstances the slide will be supported upon this ledge or flange, the springs 15 acting to force the slide over against the plate 10. It will be seen that under these circumstances the deflected margin 13 of the upper portion of the plate 10 will be spaced from the face of the slide so that another slide may be inserted into the space between this deflected margin 13 and the first slide A. The insertion of the slide B will cause the upper end of the slide A to move rearward against the force of the springs 15 and then as the slide B moves downward and when it reaches its lowermost position the slide B will force the slide A rearward off of its position on the ledge 14 and the slide A will drop out as plainly illustrated in the figures. It will be noted that while the slide B is being inserted in the slide A it will overlap the slide A and hence at one period two slides will be superposed upon each other until the slide B reaches nearly its lowermost position when it will disengage the slide A. Then the slide A will drop out. Thus I secure a dissolving view effect with but a single lantern instead of the necessity of using two lanterns directed at the same screen space and putting the slides alternately in the two lanterns.

In Figs. 6 and 7 I show another form of the invention which has exactly the same principle as the form first described but which is slightly varied in detail. In this form the plate 11ª is formed on each side of the central opening with the lugs 16. The outer surface of each lug is downwardly inclined and toward the plate 10ª, this surface being directed toward the flange 14ª. Light springs 17 are attached to the plate 10ª on each side of the opening and extend downward and toward the lugs 16, the springs being normally directed toward the middle of each lug. Now upon the insertion of a slide into the holder the lugs 16 will direct the slide downward so that its lower edge will rest upon the ledge or flange 14ª. Another slide may now be inserted outside of the first slide and if it is shifted downward as illustrated in Fig. 7, it will dislodge the lower end of the first slide from its engagement with the ledge or flange 14ª and the first slide will drop out.

The advantages of my construction, aside from those pointed out, are as shown. The device is very simple and therefore can be made at a very low cost. It will come near to doing the same work that a double lantern now does as regards dissolving views. The device takes up very little space and this is particularly essential in portable lanterns. Each slide is inserted in exactly the same place as the slide before, and therefore women or novices can readily insert the slide, the insertion of one slide automatically removing the other slide. There are no mechanical parts to get out of order. When rapid changes are desired it is not necessary to remove a slide each time one is inserted as if a piece of felt or other soft material is placed under the holder to catch the outgoing slide, five or six slides may be dropped out without the necessity of removing them.

Preferably the upper end of the slide holder in both forms of my invention is provided with an inwardly extending flange 18 which just leaves room enough to put in a new slide and makes it impossible for anyone to insert a slide on the wrong side of the holder. It is also evident that in the construction shown in Figs. 1 to 5 the springs act to shift the slide after it is inserted over against the plate 10 and hold the slide in a vertical position. At the same time the deflection of the upper margin of the plate 10 permits the slide to be readily inserted.

While I have illustrated a form of my invention which I have found to be very effective in practice, I wish it understood that I do not limit myself to the details of construction as many changes might be made therein without departing from the spirit of the invention.

Having described my invention, what I claim is:

1. A slide holder comprising oppositely disposed members spaced from each other a distance greater than the thickness of two slides, one of said members being formed with an inwardly extending slide support at its lower edge spaced from the other member a distance greater than the thickness of one side.

2. A slide holder comprising oppositely disposed members spaced from each other a distance greater than the thickness of two slides, one of said members being formed with an inwardly extending slide support at its lower edge spaced from the other member a distance greater than the thickness of one slide whereby the insertion of a second slide in the holder with its lower edge disposed between the member having the slide support and the slide already in the holder will displace the slide already in the holder from its engagement with said support to thereby permit the slide originally in the holder to drop through the holder.

3. A slide holder comprising oppositely disposed members spaced from each other a distance greater than the thickness of two slides, one of said members being formed with an inwardly extending slide support at its lower edge, the other of said members having means for guiding the slide to a position with its lower edge resting on said support but permitting said slide to move whereby the insertion of a second slide into the holder will displace the lower edge of the first slide from its engagement with said support.

4. A slide holder comprising oppositely disposed members spaced from each other a distance greater than the thickness of two slides, one of said members being formed with an inwardly projecting slide support at its lower edge and the other of said members adjacent its upper end being formed with inwardly and downwardly extending resilient slide guiding members.

5. A slide holder comprising oppositely disposed members, both of said members being formed with a central sight opening, one of said members at its lower edge having an inwardly turned flange forming a slide supporting ledge, the ledge having a width approximately that of a single slide, and laterally disposed downwardly and inwardly extending members mounted upon the opposite member of the holder and disposed adjacent the upper edge of said member whereby to guide a slide downward onto said ledge.

6. A slide holder comprising oppositely disposed members spaced from each other a distance greater than the thickness of two slides, one of said members being formed with an inwardly projecting slide support at its lower edge and one of said members at its upper edge being formed with an inwardly extending flange spaced from the other member.

In testimony whereof I hereunto affix my signature in the presence of two witnesses.

RUSSELL E. BOTHWELL.

Witnesses:
J. G. McMILLAN,
W. H. VINING.